(12) United States Patent
Igeta et al.

(10) Patent No.: US 8,350,792 B2
(45) Date of Patent: Jan. 8, 2013

(54) DISPLAY DEVICE

(75) Inventors: Koichi Igeta, Chiba (JP); Osamu Nagashima, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 615 days.

(21) Appl. No.: 12/509,523

(22) Filed: Jul. 27, 2009

(65) Prior Publication Data
US 2010/0026611 A1 Feb. 4, 2010

(30) Foreign Application Priority Data

Jul. 29, 2008 (JP) ................................. 2008-194663

(51) Int. Cl.
*G09G 3/36* (2006.01)
(52) U.S. Cl. ............. 345/87; 345/55; 345/98; 345/100; 345/204; 349/39; 349/42; 349/43
(58) Field of Classification Search .................. 345/55, 345/87, 105, 107, 98, 100, 204; 349/42, 349/43, 54, 151, 152, 39
See application file for complete search history.

(56) References Cited

U.S. PATENT DOCUMENTS

| | | | | | |
|---|---|---|---|---|---|
| 5,926,160 | A | * | 7/1999 | Furuya | 345/98 |
| 6,014,190 | A | * | 1/2000 | Kim et al. | 349/39 |
| 6,704,066 | B2 | * | 3/2004 | Tsumura et al. | 349/42 |
| 7,750,876 | B2 | * | 7/2010 | Murade | 345/87 |
| 2008/0024407 | A1 | * | 1/2008 | Yamaguchi | 345/87 |
| 2008/0088568 | A1 | * | 4/2008 | Haga et al. | 345/100 |
| 2008/0117497 | A1 | * | 5/2008 | Shimodaira | 359/296 |
| 2009/0051636 | A1 | * | 2/2009 | Natori | 345/87 |

FOREIGN PATENT DOCUMENTS

JP 2005-046352 2/2005

* cited by examiner

*Primary Examiner* — Lun-Yi Lao
*Assistant Examiner* — Gregory J Tryder
(74) *Attorney, Agent, or Firm* — Antonelli, Terry, Stout & Kraus, LLP.

(57) ABSTRACT

A display device in which a non-display region is formed in a portion of a display region which is formed of a mass of the pixels, out of the plurality of gate signal lines and the plurality of drain signal lines, the gate signal lines and the drain signal lines which are arranged so as to traverse the non-display region when the gate signal lines and the drain signal lines straightly extend imaginarily are formed in a pattern where the gate signal lines and the drain signal lines are routed around the non-display region.

4 Claims, 10 Drawing Sheets

*FIG. 10A*
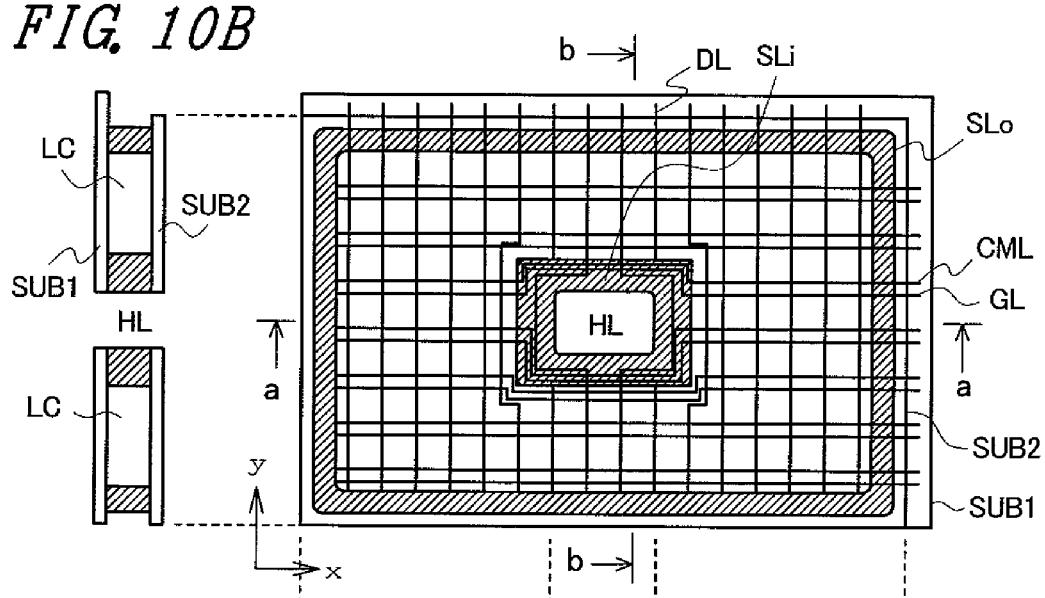
*FIG. 10B*
*FIG. 10C*
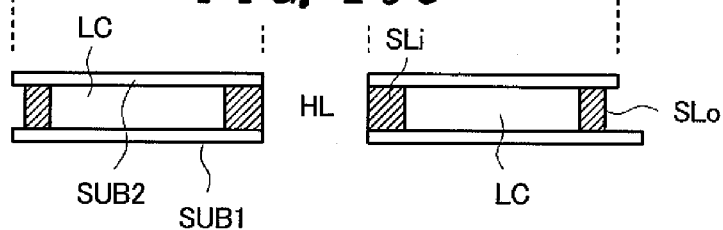

DISPLAY DEVICE

CROSS-REFERENCE TO RELATED APPLICATION

The present application claims priority from Japanese application JP 2008-194663 filed on Jul. 29, 2008, the content of which is hereby incorporated by reference into this application.

BACKGROUND OF THE INVENTION

1. Field of the Invention

The present invention relates to a display device, and more particularly to an active-matrix-type display device having a non-display region such as an opening portion, for example, in a display region.

2. Description of the Related Art

An active-matrix-type liquid crystal display device is configured as follows. On a liquid-crystal side surface of one substrate out of a pair of substrates which are arranged to face each other in an opposed manner with liquid crystal sandwiched there between, for example, a plurality of gate signal lines which extend in the x direction and are arranged parallel to each other in the y direction, and a plurality of drain signal lines which extend in the y direction and are arranged parallel to each other in the x direction are formed. In respective regions defined by these gate signal lines and drain signal lines, a pixel which is constituted of at least a thin film transistor which is turned on in response to a scanning signal supplied from the gate signal line and a pixel electrode to which a video signal is supplied from the drain signal line via the thin film transistor in an ON state is formed.

As one type of such an active-matrix-type display device, there has been known a so-called lateral-electric-field type liquid crystal display device. This lateral-electric-field liquid crystal display device is configured such that counter electrodes which generate electric fields between the counter electrodes and the pixel electrodes are formed on the above-mentioned liquid-crystal side surface of one substrate, and a reference signal which becomes the reference for a video signal is supplied to the counter electrodes via a common signal line which is formed on the above-mentioned liquid-crystal side surface of one substrate.

Further, with respect to a so-called vertical-electric-field type liquid crystal display device in which counter electrodes are formed on the substrate on a side opposite to the substrate on which the pixel electrodes are formed, there has been known a liquid crystal display device in which capacitive signal lines which supply capacitance between the pixel electrodes and the counter electrodes are formed on the substrate side on which the pixel electrodes are formed.

With respect to such display devices, as a liquid crystal display device which is applicable to amusement equipment, for example, there has been known a display device in which an opening portion constituted of a through hole is formed in a portion of a display region constituted of a mass of pixels. Such a display device is disclosed in JP-A-2005-46352, for example.

SUMMARY OF THE INVENTION

Here, with respect to the liquid crystal display device having the opening portion in the display region, in considering the arrangement of gate signal lines, drain signal lines, counter voltage signal lines or capacitive signal lines (hereinafter counter voltage signal lines and capacitive signal lines will be also referred to as "common signal lines" collectively in some cases) in the vicinity of the opening portion, for example, the constitution shown in FIG. 10 may be provided.

Here, FIG. 10 corresponds to FIG. 1 which shows the constitution of an embodiment of the present invention. Accordingly, in the explanation made hereinafter, only undesired parts are explained with respect to the constitution shown in FIG. 10, and the reference should be made to the explanation of the constitution shown in FIG. 1 described later with respect to the detailed explanation of peripheral parts.

In FIG. 10, a substrate SUB1 and a substrate SUB2 are arranged to face each other in an opposed manner with liquid crystal (not shown in the drawing) sandwiched therebetween. On a liquid-crystal-side surface of the substrate SUB1, gate signal lines GL which extend in the x direction and are arranged parallel to each other in the y direction in the drawing, common signal lines CML each of which is arranged between the respective gate signal lines GL and parallel to the gate signal lines GL, and drain signal lines DL which extend in the y direction and are arranged parallel to each other in the x direction in the drawing are formed. To these gate signal lines GL, common signal lines CML and drain signal lines DL, signals corresponding to these signal lines are supplied from respective one end sides of these lines.

Out of these gate signal lines GL, the common signal lines CML and the drain signal lines DL, lines which are arranged so as to transverse an opening portion HL (non-display region) when the lines straightly extend imaginarily are formed in a pattern where these lines are routed around the opening portion HL.

In this case, although the gate signal lines GL, the common signal lines CML and the drain signal lines DL which are arranged while being routed around the opening portion HL are arranged in a concentrated manner on the periphery of the opening portion HL, it is inevitable to increase an area occupied by the arrangement of these lines thus giving rise to a drawback that a substantial liquid crystal display region is narrowed.

Accordingly, it is an object of the present invention to provide a display device which can decrease an area occupied by the arrangement of signal lines on the periphery of the non-display region.

The display device of the present invention is configured such that the formation of common signal lines such as capacitive signal lines on a periphery of a non-display region can be obviated based on a fact that the same signal is supplied to the common signal lines at same timing even when the common signal lines are provided in plural.

The present invention may be configured as follows, for example.

(1) According to one aspect of the present invention, there is provided a display device which forms a plurality of gate signal lines arranged parallel to each other in one direction, a plurality of drain signal lines arranged parallel to each other in the direction which intersects said one direction, and a plurality of common signal lines arranged along one group of signal lines out of the gate signal lines and the drain signal lines, each common signal line being arranged between respective signal lines of said one group of signal lines on a substrate, and which defines a region surrounded by a pair of neighboring gate signal lines and a pair of neighboring drain signal lines as a region of a pixel, wherein a non-display region is formed in a portion of a display region which is formed of a mass of the pixels, out of the plurality of gate signal lines and the plurality of drain signal lines, the gate signal lines and the drain signal lines which are arranged so as to traverse the non-display region when the gate signal lines and the drain signal lines straightly extend imaginarily are formed in a pattern where the gate signal lines and the drain signal lines are routed around the non-display region, and out of the plurality of common signal lines, first common signal lines which are arranged so as to traverse the non-display region when the first common signal lines straightly extend imaginarily are formed in a state that the first common signal lines are physically separated to be arranged on one side and other side of the non-display region, the separated common signal lines on respective sides are respectively electrically connected to a connection lines arranged in an intersecting manner with the common signal lines in the vicinity of the non-display region, and the connection lines are electrically connected with second common signal lines which are arranged so as not to traverse the non-display region even when the second common signal lines straightly extend imaginarily out of the plurality of common signal lines.

(2) In the display device having the constitution (1), for example, the above-mentioned one group of signal lines may be the plurality of gate signal lines, and the connection lines are formed on the same layer as the drain signal lines, and each connection line may be formed in a region between the neighboring drain signal lines.

(3) In the display device having the constitution (2), for example, the electrical connection between the connection line and the common signal line may be established via a through hole formed in an insulation film.

(4) In the display device having the constitution (1), for example, the first common signal lines which are physically separated by the non-display region may extend closer to a non-display region side than connection portions between the first common signal lines and the connection line, and extending portions of the first common signal lines may have intersecting portions where the first common signal lines intersect with the signal lines extending in the direction which intersects with the common signal lines out of the drain signal lines and the gate signal lines.

(5) In the display device having the constitution (4), for example, at least one common signal line out of the first common signal lines which are physically separated by the non-display region may be provided with, on an edge portion of the non-display region side, one or a plurality of branch lines which intersects with the signal lines extending in the direction which intersect with the common signal lines out of the drain signal lines and the gate signal lines.

(6) In the display device having the constitution (4), for example, at least one common signal line out of the first common signal lines which are physically separated by the non-display region may be provided with, on an edge portion of the non-display region side, a plurality of intersecting portions where the common signal line intersects with the signal lines extending in the direction which intersects with the common signal line out of the drain signal lines and the gate signal lines, and may be a large width line which increases a line width thereof corresponding to the number of the plurality of intersecting portions on the side of the non-display region.

(7) In the display device having the constitution (1), for example, the pixel may include a pixel electrode to which a video signal is supplied from the drain signal line via a thin film transistor, and a counter electrode to which a reference signal which becomes the reference with respect to the video signal is supplied on the substrate, and the common signal line may be a signal line which is formed along the gate signal line and supplies the reference signal to the counter electrode.

(8) In the display device having the constitution (7), for example, the common signal line may be formed on the same layer as the gate signal line.

(9) In the display device having the constitution (7), for example, the common signal line may be formed on a gate insulation film for the thin film transistor which is formed so as to cover the gate signal line.

(10) In the display device having the constitution (7), for example, out of the pixel electrode and the counter electrode, one electrode may be a planar first electrode, and another electrode out of the pixel electrode and the counter electrode may include a plurality of linear second electrodes which are arranged parallel to each other above the first electrode by way of an insulation film, and the electrical connection between the connection line and the common signal line maybe established via a layer which is formed on the same layer as the first electrode and is made of the same material as the first electrode.

(11) In the display device having the constitution (1), for example, the pixel may include a pixel electrode to which a video signal is supplied from the drain signal line via a thin film transistor, and the common signal line may be a capacitive signal line which is formed along the gate signal line, and has an overlapping portion with the pixel electrode by way of an insulation film.

(12) In the display device having the constitution (11), for example, the common signal line may be formed on the same layer as the gate signal line.

(13) In the display device having the constitution (11), for example, the common signal line may be formed on a gate insulation film for the thin film transistor which is formed so as to cover the gate signal line.

Here, the above-mentioned constitution merely forms one example, and various modifications of the present invention are conceivable without departing from the technical concept of the present invention. Further, constitutional examples of the present invention other than the above-mentioned constitution will become apparent from the whole description of this specification and corresponding drawings.

According to a display device of the present invention, it is possible to make an area occupied by an arrangement of signal lines small on the periphery of the non-display region.

Other constitutions of the present invention will become apparent from the description of the whole specification.

BRIEF DESCRIPTION OF THE DRAWINGS

FIG. 10A, FIG. 10B and FIG. 10C are schematic plan views of a conventional display device.

DESCRIPTION OF THE PREFERRED EMBODIMENTS

Figure 1A:
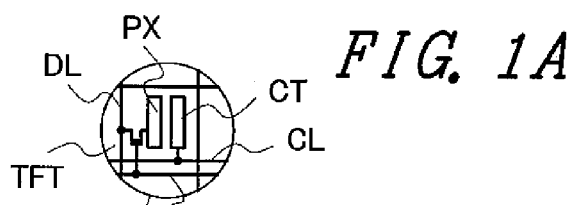
FIG. 1A, FIG. 1B and FIG. 1C are schematic constitutional views showing a display device according to an embodiment 1 of the present invention.

Embodiments of the present invention are explained in conjunction with drawings. Here, in the drawings and embodiments, parts having identical or similar functions are given same numerals and their repeated explanation is omitted.

Embodiment 1

(Whole Constitution)

Figure 1B:
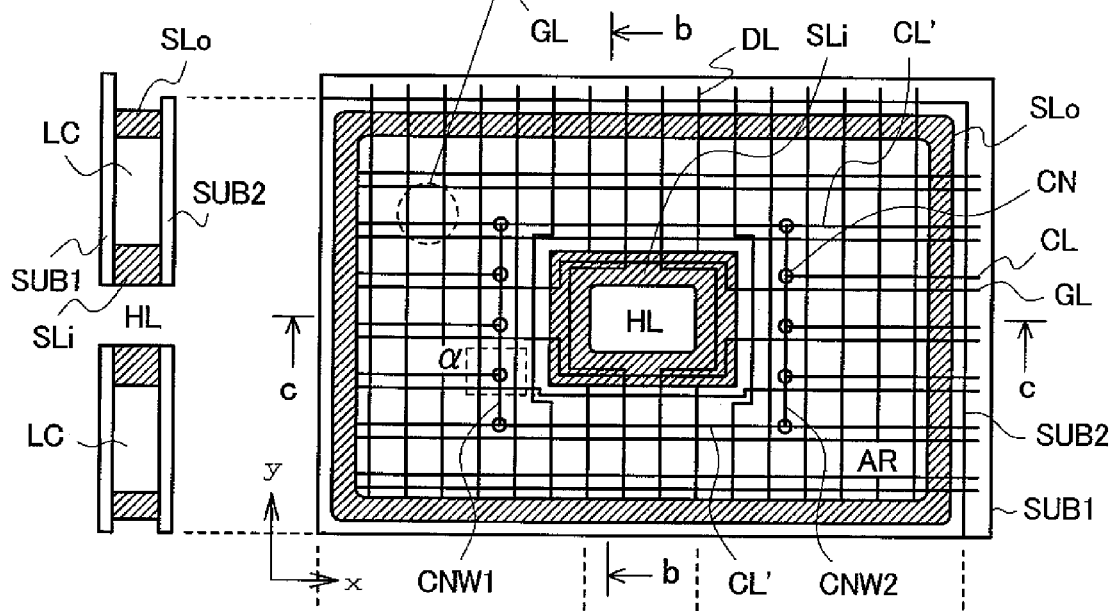
Figure 1C:
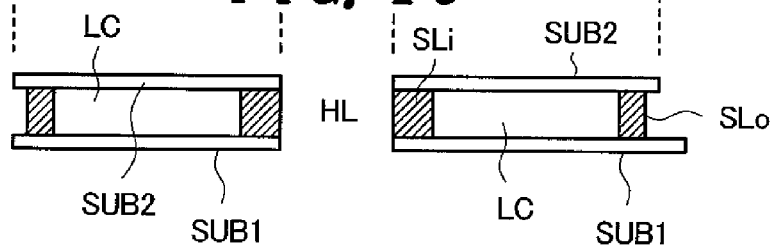

FIG. 1A is a plan view showing the schematic constitution of a liquid crystal display device. FIG. 1B is a cross-sectional view taken along a line b-b in FIG. 1A, and FIG. 1C is a cross-sectional view taken along a line c-c in FIG. 1A.

The liquid crystal display device includes an envelope which is constituted of substrates SUB1, SUB2 with liquid crystal LC sandwiched therebetween. Here, an opening portion HL having a relatively large area is formed in a center portion of the substrate SUB1 and a center portion of the substrate SUB2 respectively, for example.

The substrate SUB2 is fixed to the substrate SUB1 using an annular outer seal member SLo which is formed between outer peripheries of the respective substrates SUB1, SUB2 and an annular inner seal member SLi which is formed around an opening portion HL. The liquid crystal LC is filled in a region defined inside the outer seal member SLo and outside the inner seal member SLi. The region which is filled with liquid crystal constitutes a liquid crystal display region AR.

As shown in FIG. 1A, on a liquid-crystal-LC-side surface of the substrate SUB1, gate signal lines GL which extend in the x direction and are arranged parallel to each other in the y direction, drain signal lines DL which extend in the y direction and are arranged parallel to each other in the x direction, and common signal lines CL which are arranged parallel to each other in a state that each common signal line CL is arranged between neighboring gate signal lines GL are formed. To the gate signal lines GL, the drain signal lines DL and the common signal lines CL, signals corresponding to respective signal lines are supplied from respective one end sides of these lines.

In this embodiment, the gate signal lines GL and the common signal lines CL are formed on the substrate SUB1 in a coplanar manner, and the drain signal lines DL are formed on an insulation film (insulation film GI shown in FIG. 2) which is formed on the substrate SUB1 so as to cover the gate signal lines GL and the common signal lines CL.

In this case, out of these gate signal lines GL, some gate signal lines GL which are arranged so as to traverse the opening portion HL and a region around the opening portion HL when such gate signal lines GL straightly extend imaginarily are formed in a pattern where the gate signal lines GL are routed around a periphery of the opening portion HL.

To be more specific, the gate signal lines GL which are arranged so as to traverse an upper side of the opening portion HL in the drawing and a region around the upper side of the opening portion HL when the gate signal lines GL straightly extend imaginarily are formed in a pattern where the gate signal lines GL are routed around an upper periphery of the opening portion HL in the drawing. On the other hand, the gate signal lines GL which are arranged so as to traverse a lower side of the opening portion HL in the drawing and a periphery of the lower side of the opening portion HL when the gate signal lines GL straightly extend imaginarily are formed in a pattern where the gate signal lines GL are routed around a lower periphery of the opening portion HL in the drawing. In the same manner as the gate signal lines GL, out of the drain signal lines DL, some drain signal lines DL which are arranged so as to traverse the opening portion HL and a periphery of the opening portion HL when such drain signal lines DL straightly extend imaginarily are formed in a pattern where the drain signal lines DL are routed around a periphery of the opening portion HL. To be more specific, the drain signal lines DL which are arranged so as to traverse a left side of the opening portion HL in the drawing and a left-side periphery of the opening portion HL when the drain signal lines DL straightly extend imaginarily are formed in a pattern where the drain signal lines DL are routed around a left-side periphery of the opening portion HL in the drawing, and the drain signal lines DL which are arranged so as to traverse a right side of the opening portion HL in the drawing and a right-side periphery of the opening portion HL when the drain signal lines DL straightly extend imaginarily are formed in a pattern where the drain signal lines DL are routed around a right periphery of the opening portion HL in the drawing.

On the periphery of the opening portion HL, portions of the gate signal lines GL and the drain signal lines DL which are formed so as to be routed around the opening portion HL are, as shown in FIG. 1A, arranged within a region where the inner seal member SLi is formed. However, the present invention is not limited to the above-mentioned arrangement, and the respective portions of the gate signal lines GL and the drain signal lines DL may be arranged to extend to the outside of the region where the inner seal member SLi is formed.

On the other hand, out of the common signal lines CL, the common signal lines CL (first common signal lines) which are arranged so as to traverse the opening portion HL and the periphery of the opening portion HL when such common signal lines CL straightly extend imaginarily are formed in a state that the common signal lines CL are physically separated into the common signal lines CL arranged on one side (left side in the drawing) of the opening portion HL and the common signal lines CL arranged on another side (right side in the drawing) of the opening portion HL. The separated common signal lines CL on each side are electrically connected with each other via a connection line CNW in the vicinity of the opening portion HL. The connection line CNW has both ends thereof electrically connected to the common signal lines CL (second common signal lines) which are arranged so as not to traverse the opening portion HL when the common signal lines CL straightly extend imaginarily. To be more specific, the connection line CNW (indicated by symbol CNW1 in the drawing) which is arranged on a left side of the opening portion HL in the drawing is formed on the same layer as the drain signal lines DL between the drain signal lines DL and is arranged parallel to the drain signal lines DL, and both ends of the connection line CNW are electrically connected to the common signal lines CL (indicated by symbol CL' in the drawing) which are arranged so as not to traverse the opening portion HL. With respect to the common signal lines CL which are separated by the opening portion HL, the common signal lines CL which are arranged on a left side of the opening portion HL in the drawing have end portions thereof arranged in the vicinity of the periphery of the opening portion HL, and these end portions are electrically connected to the connection line CNW1. In the same manner as the connection line CNW1, the connection line CNW (indicated by symbol CNW2 in the drawing) which is arranged on a right side of the opening portion HL in the drawing is formed on the same layer as the drain signal lines DL between the drain signal lines DL and is arranged parallel to the drain signal lines DL, and both ends of the connection line CNW2 are electrically connected to the common signal lines CL (indicated by symbol CL' in the drawing) which are arranged so as not to traverse the opening portion HL. With respect to the common signal lines CL which are separated by the opening portion HL, the common signal lines CL which are arranged on a right side of the opening portion HL in the drawing has end portions thereof arranged in the vicinity of the periphery of the opening portion HL, and the end portions are electrically connected to the connection line CNW2.

Here, the connection lines CNW1, CNW2 are formed on the layer different from the layer on which the common signal lines CL are formed (on the same layer as the drain signal lines DL as described above) by way of an insulation film (for example, insulation film GI shown in FIG. 2). The electrical connection between the connection lines CNW1, CNW2 and the common signal lines CL is established as shown in FIG. 3 as described later, for example.

Due to such a constitution, it is possible to establish the electrical connection between the common signal lines CL which are arranged on the left side of the opening portion HL in the drawing and the common signal lines CL which are arranged on the right side of the opening portion HL in the drawing corresponding to the left-side common signal lines CL without adopting the constitution in which the common signal lines CL are arranged to be routed around the periphery of the opening portion HL. To the respective common signal lines CL, different from other signal lines (the gate signal lines GL, drain signal lines DL), the same signals are supplied at same timing and hence, it is sufficient to electrically connect the respective common signal lines CL via the connection lines CNW.

A region which is surrounded by a pair of neighboring gate signal lines GL and a pair of neighboring drain signal lines DL define a pixel region (within a dotted line frame in the drawing). In the pixel region, as described in an equivalent circuit shown in an enlarged view A of the pixel region, a thin film transistor TFT which is turned on in response to a signal (scanning signal) from the gate signal line GL, a pixel electrode PX to which a signal (video signal) is supplied from the drain signal line DL via the thin film transistor TFT in an ON state, and a counter electrode CT to which a signal which is used as the reference with respect to the video signal is supplied via the common signal line CL are formed.

The pixel having such a constitution is configured to generate an electric field including components parallel to the substrate SUB1 between the pixel electrode PX and the counter electrode CT and drive liquid crystal. A method which drives liquid crystal by the electric field which includes components parallel to the substrate SUB1 in the abovementioned manner is referred to as an IPS (In Plane Switching) method.

(Constitution of Pixel)

Figure 2A:
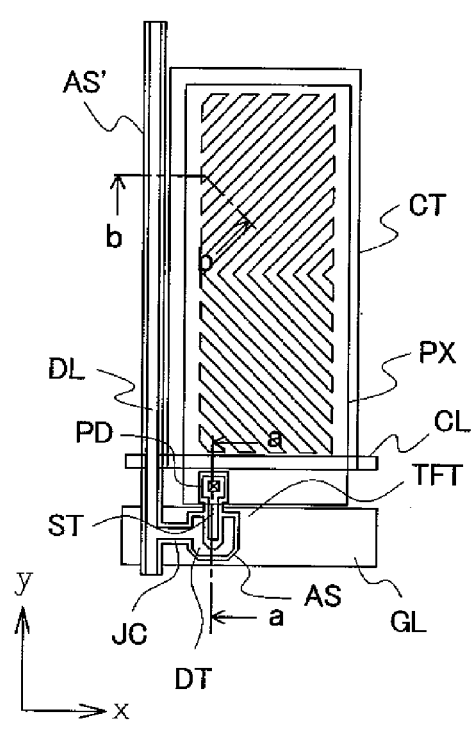
FIG. 2A, FIG. 2B and FIG. 2C are constitutional views showing one example of the pixel constitution of the display device shown in FIG. 1A, FIG. 1B and FIG. 1C.
Figure 2B:
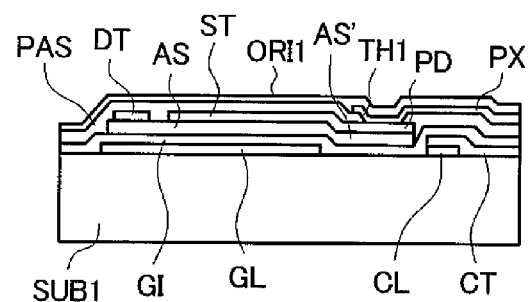
Figure 2C:
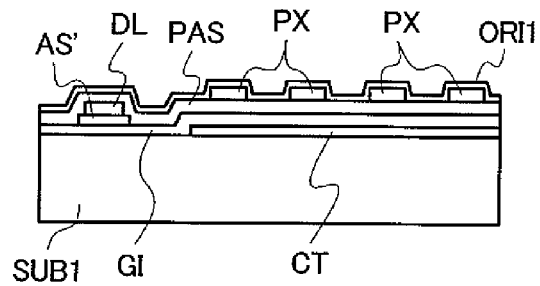

FIG. 2A is a plan view showing an embodiment of one pixel out of the respective pixels which are arranged in a matrix array on the substrate SUB1 side of the liquid crystal display device. Further, FIG. 2B is a cross-sectional view taken along a line a-a in FIG. 2A, and FIG. 2C is a cross-sectional view taken along a line b-b in FIG. 2A.

First of all, the gate signal lines GL and the common signal lines CL are formed on a liquid-crystal-side surface (front surface) of the substrate SUB1 parallel to each other.

A planar counter electrode CT which is made of a transparent conductive material such as ITO (Indium-Tin-Oxide), for example, is formed in the most pixel region except for a slight periphery of the pixel region. The counter electrode CT has a peripheral portion thereof on a common-signal-line-CL side formed over the common signal line CL in an overlapping manner and hence, the counter electrode CT is electrically connected to the common signal line CL.

Further, on a surface of the substrate SUB1, the insulation film GI is formed in a state that the insulation film GI covers the gate signal lines GL, the common signal lines CL and the counter electrode CT. The insulation film GI functions as a gate insulation film for the thin film transistor TFT in a region where the thin film transistor TFT described later is formed.

An amorphous semiconductor layer AS made of amorphous silicon, for example, is formed on an upper surface of the insulation film GI at a position where the insulation film GI overlaps with a portion of the gate signal line GL. The semiconductor layer AS constitutes a semiconductor layer of the thin film transistor TFT.

Here, the semiconductor layer AS is, for example, in addition to the region where the thin film transistor TFT is formed, as indicated by symbol AS', formed below the drain signal line DL, below a connection portion JC where the drain signal line DL and the drain electrode DT of the thin film transistor TFT are electrically connected with each other, and below a portion (including a pad portion PD) where a source electrode ST extends over the region where the thin film transistor TFT is formed. Due to the provision of the semiconductor layer AS, for example, the drain signal line DL can be formed with a small step.

Further, the drain signal line DL is formed in a state that the drain signal line DL extends in the y direction in the drawing, the drain signal line DL forms an extending portion which extends toward a thin film transistor TFT side on a portion thereof, and the extending portion (connection portion JC) is connected to the drain electrode DT of the thin film transistor TFT which is formed on the semiconductor layer AS.

Further, the source electrode ST which is formed simultaneously with the formation of the drain signal line DL and the drain electrode DT is formed in a state that the source electrode ST is arranged to face the drain electrode DT in an opposed manner on the semiconductor layer AS and the source electrode ST includes an extending portion which slightly extends from the semiconductor layer AS to a pixel region side. The extending portion is configured to reach the pad portion PD described later which is connected to the pixel electrode PX.

The drain electrode DT is formed into a U-shaped pattern so as to surround a distal end portion of the source electrode ST, for example. Due to such a constitution, a channel width of the thin film transistor TFT can be made large.

In forming the semiconductor layer AS on the insulation film GI, for example, a surface of the semiconductor layer AS is doped with high-concentration impurities, the drain electrode DT and the source electrode ST are formed by patterning, for example and, thereafter, a high-concentration impurity layer which is formed on regions other than the regions where the drain electrode DT and the source electrode ST are formed are removed by etching using a photoresist film formed on the drain electrode DT and the source electrode ST as a mask. Due to such constitution, the high-concentration impurity layer remains between the semiconductor layer AS and the drain electrode DT as well as between the semiconductor layer AS and the source electrode ST thus forming an ohmic contact layer using the impurity layer.

By adopting such a constitution, the thin film transistor TFT is constituted of a transistor having the so-called inverse-staggered-type MIS (Metal Insulator Semiconductor) structure in which the gate signal line GL is used as a gate electrode.

On a surface of the substrate SUB1, a protective film PAS which is formed of an insulation film is formed so as to cover the thin film transistor TFT. The protective film PAS is provided for preventing direct contact between the thin film transistor TFT and liquid crystal. Although the protective film PAS may be formed of only an inorganic material layer, the protective film PAS may be formed by stacking an organic material layer on an upper surface of the inorganic material layer by coating. With the use of the organic material layer, a surface of the protective film PAS can be leveled.

The pixel electrodes PX are formed on an upper surface of the protective film PAS. The pixel electrode PX is formed of a transparent conductive film made of ITO (Indium-Tin-Oxide) or the like, for example, and the pixel electrode PX is formed in an overlapping manner with the counter electrode CT over a wide area.

Further, a large number of slits are formed in the pixel electrode PX in a state that these slits are arranged parallel to each other in the direction orthogonal to the longitudinal direction of the slits. Due to such a constitution, the pixel electrode PX is formed of a group of electrodes which is constituted of a large number of linear electrodes having respective both ends thereof connected with each other.

Here, as shown in FIG. 2A, the pixel region is vertically separated into two regions in the drawing, and each electrode of the pixel electrode PX is formed so as to extend in the direction which makes +45 degrees with respect to the running direction of the gate signal lines GL in one region of the pixel region, for example, and to extend in the direction which makes −45 degrees with respect to the running direction of the gate signal lines GL in another region of the pixel region, for example. That is, the pixel electrode PX adopts a so-called multi-domain method. When the direction of the slits (direction of a group of electrodes of the pixel electrode PX) formed in the pixel electrode PX within one pixel is only one direction, the colorination occurs depending on the viewing direction. The above-mentioned constitution adopting the multi-domain method can overcome this drawback.

The pixel electrode PX having such a constitution has a thin-film-transistor-TFT-side portion thereof electrically connected to the pad portion PD of the source electrode ST of the thin film transistor TFT via a through hole TH1 which is formed in the protective film PAS. Further, an alignment film ORI1 is formed on a surface of the substrate SUB1 so as to also cover the pixel electrodes PX.

(Constitution of Contact Portion)

Figure 3A:
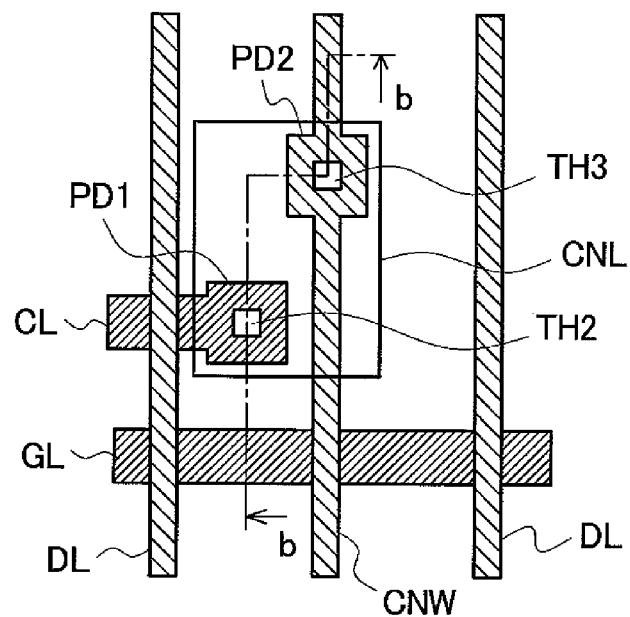
FIG. 3A is an enlarged plan view of a portion inside a dotted rectangular frame in FIGS. 1A to 1C and FIG. 3B is a cross-sectional view taken along a line b-b in FIG. 3A.
Figure 3B:
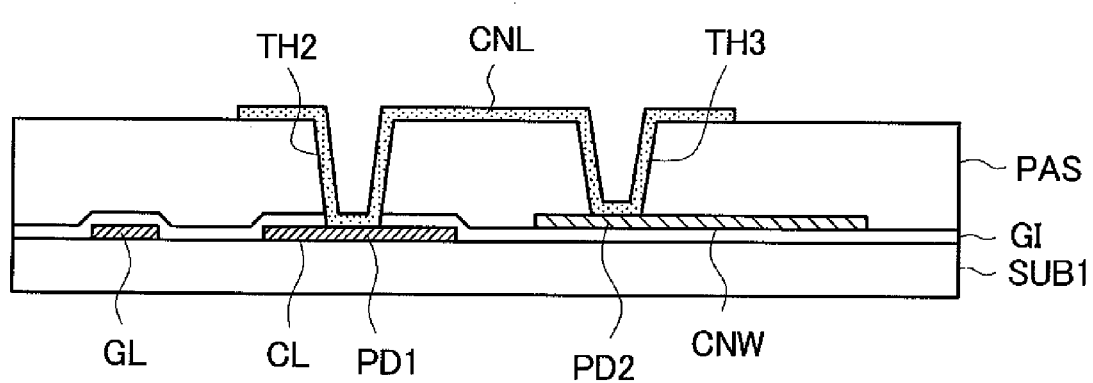

FIG. 3A and FIG. 3B are views showing an embodiment of the electrical connection structure which connects the common signal line CL and the connection line CNW. For example, these drawings show the constitution of a portion described in a dotted rectangular frame a in FIG. 1, for example. FIG. 3A is a plan view, and FIG. 3B is a cross-sectional view taken along a line b-b in FIG. 3A.

In FIG. 3A and FIG. 3B, the gate signal lines GL and the common signal lines CL are formed on an upper surface of the substrate SUB1 in a coplanar manner.

The common signal line CL (first common signal line) shown in FIG. 3A is formed at a position where the first common signal line CL traverses the opening portion HL (not shown in the drawing) when the first common signal line CL is allowed to straightly extend rightward in the drawing, and has an end portion thereof arranged in the vicinity of the periphery of the opening portion HL. A pad portion PD1 having a relatively large area is formed on the end portion.

The insulation film GI is formed on the substrate SUB1 so as to cover the gate signal lines GL and the common signal lines CL. The insulation film GI is configured to functions as a gate insulation film in a region where the thin film transistor TFT is formed and, at the same time, functions as an inter-layer insulation film for the drain signal line DL with respect to the gate signal line GL.

The drain signal line DL and the connection line CNW are formed on an upper surface of the insulation film GI in a coplanar manner. The connection line CNW forms a pad portion PD2 having a relatively large width on a midst portion thereof in the vicinity of the pad portion PD1 of the common signal line CL.

The protective film PAS is formed on the substrate SUB1 so as to cover the drain signal lines DL and the connection lines CNW. In the protective film PAS, through holes TH2 each of which exposes a portion of the pad portion PD1 of the common signal line CL and a through hole TH3 each of which exposes a portion of the pad portion PD2 of the connection line CNW are formed.

A conductive film CNL made of ITO which is formed simultaneously with the pixel electrodes PX is formed on an upper surface of the protective film PAS. The conductive film CNL is connected to the pad portion PD1 of the common signal line CL via the through hole TH2 and is connected to the pad portion PD2 of the connection line CNW via the through hole TH3 thus establishing the electrical connection between the common signal line CL and the connection line CNW. By using the material for forming the pixel electrode PX as the material for forming the conductive film CNL, it is possible to suppress the increase of the number of manufacturing steps.

Here, the alignment film ORI1 (see FIG. 2B) is formed on an upper surface of the protective film PAS in a state that the alignment film ORI1 covers the conductive film CNL. In FIG. 3B, however, the illustration of the alignment film ORI1 is omitted.

Embodiment 2

Figure 4:
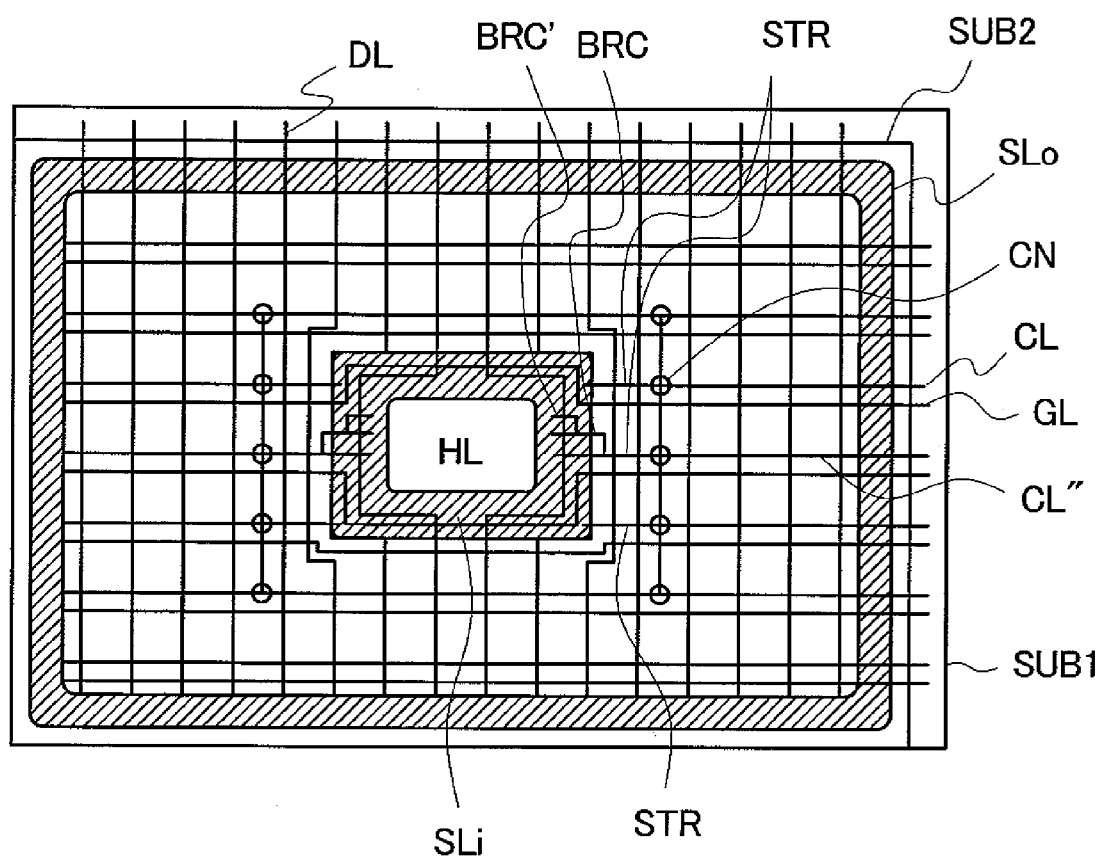
FIG. 4 is a schematic plan view showing the display device according to an embodiment 2 of the present invention.

FIG. 4 is a view showing the display device according to an embodiment 2 of the present invention, and corresponds to FIG. 1A.

In FIG. 4, the constitution which makes the embodiment 2 different from the embodiment 1 shown in FIG. 1A lies in that respective common signal lines CL (first common signal line) which are physically separated by an opening portion HL extend closer to an opening portion HL side than connecting portions thereof with a connection line CNW, and intersecting portions between the common signal lines CL and the drain signal lines DL are formed by these extending lines STR.

The reason that such constitution is adopted is that it is desirable to set the number of intersecting portions of the drain signal line DL with the common signal line CL substantially equal with respect to the respective drain signal lines DL. When the number of intersecting portions of the drain signal line DL with the common signal lines CL differ with respect to the respective drain signal lines DL, line capacitance differs for respective drain signal lines DL thus generating brightness irregularities between neighboring pixels. Here, intersecting portions are also formed between the drain signal lines DL and the gate signal lines DL. However, the gate signal lines GL are formed without being separated and hence, the number of intersecting portions of the drain signal line DL with the gate signal line GL is equal with respect to the respective drain signal lines DL thus giving rise to no drawback. Accordingly, the explanation is made hereinafter only with respect to the relationship with the drain signal lines DL and the common signal lines CL.

The number of intersecting portions of the drain signal line DL with the common signal lines CL becomes small in a periphery of the opening portion HL. Accordingly, the mere extension of the respective common signal lines CL physically separated closer to the opening portion HL side than the connecting portions with the connection line CNW cannot make the number of intersecting portions of the drain signal line DL with the common signal lines CL equal with respect to the respective drain signal lines DL.

Accordingly, in this embodiment 2, a plurality of branch lines BRC is formed on an opening-portion-HL-side edge portion of a specified common signal line CL (indicated by symbol CL", a plurality of common signal lines CL" being also used), for example, and these branch lines BRC intersect with the drain signal line DL so that the number of intersecting portions of the drain signal line DL with the common signal line CL can be increased with respect to the respective drain signal lines DL.

There exists a tendency that the number of intersecting portions of the drain signal line DL with the common signal lines CL is decreased as the drain signal line DL approaches the opening portion HL side and hence, the branch line BRC is formed in a pattern that the branch line BRC has a new branch line BRC' as the branch line BRC approaches the opening portion HL.

In realizing the constitution of the embodiment 2, it is not always necessary to set the number of intersecting portions of the drain signal line DL with the common signal lines CL completely equal with respect to the respective drain signal lines DL. This is because that, for example, when it is necessary to set a line width of the common signal line CL small in the vicinity of the opening portion HL, it is necessary to set the number of intersecting portions of the drain signal line DL with the common signal line CL larger than a predetermined number (line capacitance is determined based on an area of the intersecting portion). Further, it is not necessary to set the line capacitance generated between the drain signal line DL and the common signal line CL completely equal with respect to the respective drain signal line DL. This is because a sufficient advantageous effect can be obtained by adopting the constitution which approximately sets the line capacitance between the drain signal line DL and the common signal line CL equal with respect to the respective drain signal lines DL.

Embodiment 3

Figure 5:
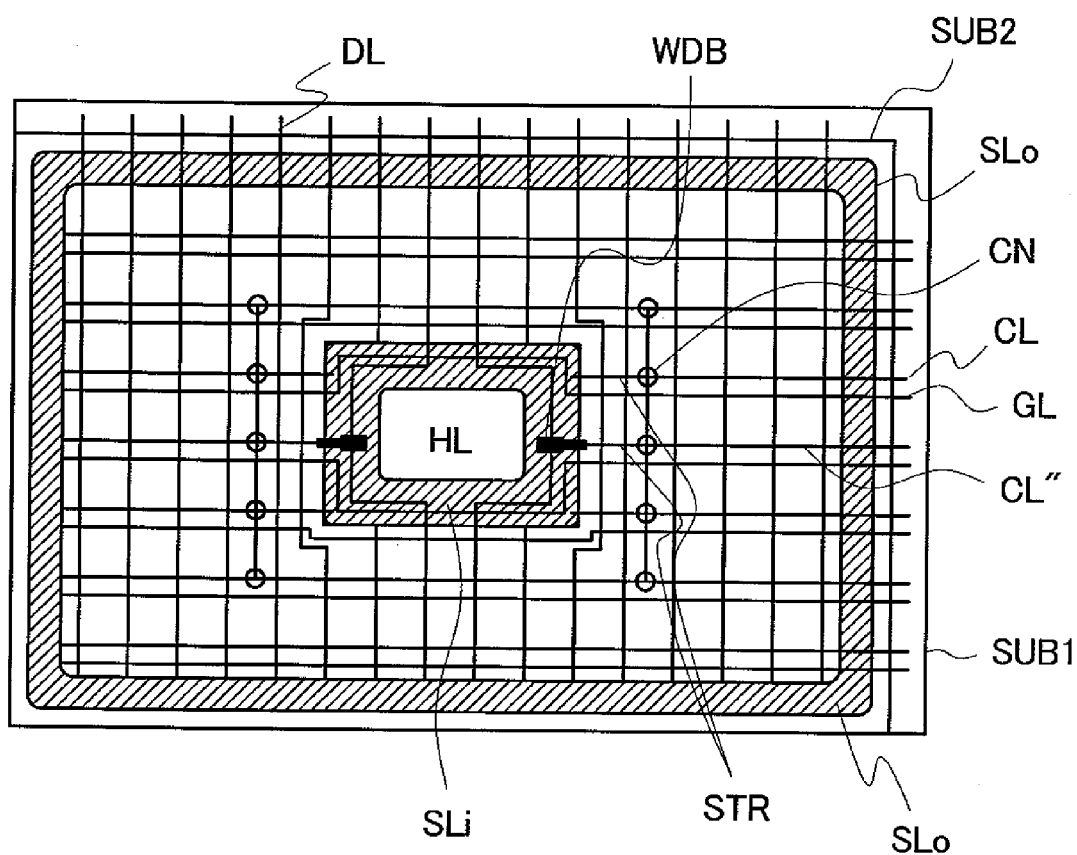
FIG. 5 is a schematic plan view showing the display device according to an embodiment 3 of the present invention.

FIG. 5 is a view showing a display device according to an embodiment 3 of the present invention, and corresponds to FIG. 4.

As shown in FIG. 5, this embodiment adopts the substantially same constitution as the embodiment 2 shown in FIG. 4 with respect to a point that respective common signal lines CL which are physically separated by an opening portion HL extend closer to an opening portion HL side than connecting portions CN of the common signal lines CL with a connection line CNW, and intersecting portions between the common signal lines CL and the drain signal lines DL are formed by these extending lines STR.

However, this embodiment 3 differs from the embodiment 2 shown in FIG. 4 with respect to the following constitution. That is, among the common signal lines CL, a specified common signal line CL (indicated by symbol CL", a plurality of common signal lines CL" being also used) increases a line width thereof at an opening-portion-HL-side edge portion thus forming a large width line WDB. By allowing the drain signal line DL to intersect with the large width line WDB, line capacitance between the drain signal line DL and the common signal line CL is increased. Due to such a constitution, this embodiment 3 can set the line capacitance generated between the drain signal line DL and the common signal line CL substantially equal with respect to the respective drain signal lines DL.

Further, as mentioned previously, there exists a tendency that the number of intersecting portions of the drain signal line DL with the common signal lines CL is decreased as the drain signal line DL approaches the opening portion HL side and hence, the large width line WDB is formed in a pattern that a width of the large width line WDB is increased as the large width line WDB approaches the opening portion HL.

Also in this embodiment 3, it is not necessary to set the line capacitance generated between the drain signal line DL and the common signal line CL completely equal with respect to the respective drain signal line DL. That is, a sufficient advantageous effect can be obtained also by adopting the constitution which approximately sets the line capacitance between the drain signal line DL and the common signal line CL equal with respect to the respective drain signal lines DL.

Embodiment 4

Figure 6A:
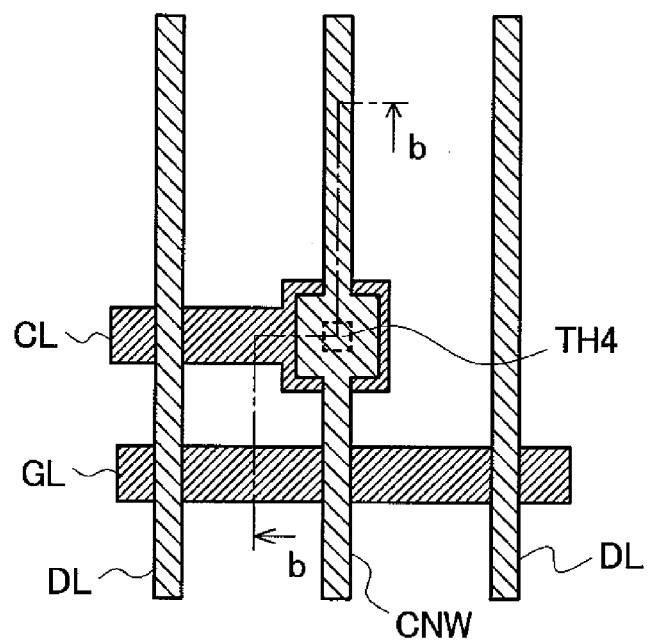
FIG. 6A and FIG. 6B are constitutional views showing the display device according to an embodiment 4 of the present invention.
Figure 6B:
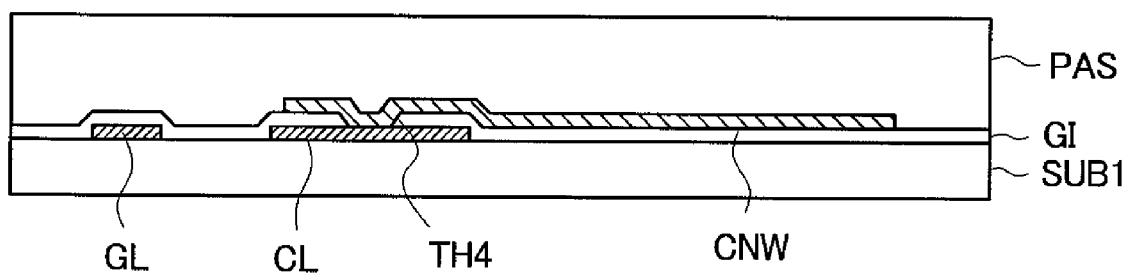

FIG. 6 is a view showing the display device according to an embodiment 4 of the present invention, and corresponds to FIG. 3.

In the constitution shown in FIG. 3, the electrical connection of the common signal line CL and the connection line CNW via the through hole is established via two through holes TH2, TH3 formed in the protective film PAS which is formed so as to cover the thin film transistor TFT, and a material (ITO) equal to a material for forming the pixel electrode PX is used as a connection material.

However, in FIG. 6, a connection line CNW and a common signal line CL are directly electrically connected with each other via a through hole TH4 formed in an insulation film GI.

The insulation film GI functions as a gate insulation film for the thin film transistor TFT, and is usually formed as a film which has no through hole therein. However, by establishing the electrical connection between the connection line CNW and the common signal line CL via the through hole TH4 formed in the insulation film GI, an occupying area of the through hole TH4 can be made small thus acquiring an advantageous effect that a high-definition wiring pattern can be formed.

Embodiment 5

Figure 7:
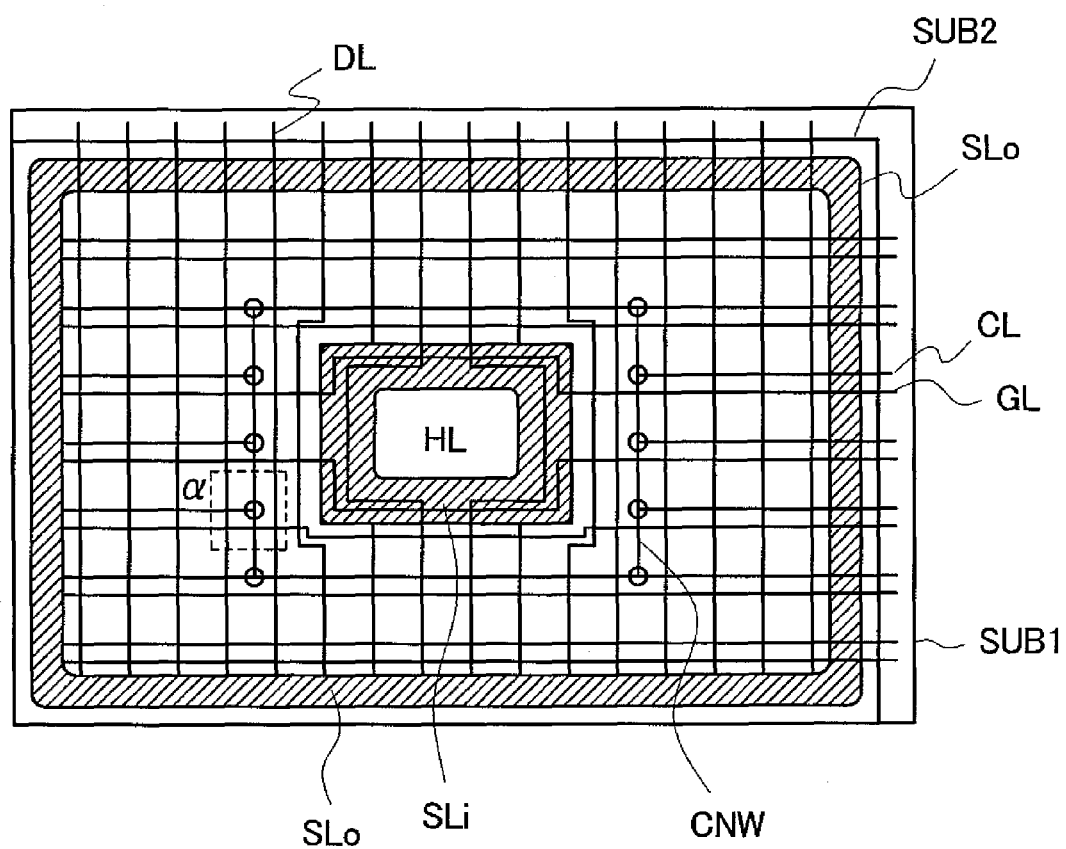
FIG. 7 is a schematic plan view showing the display device according to an embodiment 5 of the present invention.

FIG. 7 is a view showing the display device according to an embodiment 5 of the present invention, and corresponds to FIG. 1A.

In FIG. 7, the constitution which makes this embodiment different from the embodiment shown in FIG. 1A lies in that common signal lines CL are formed on a layer different from a layer on which gate signal lines GL are formed. For example, in this embodiment 5, the common signal lines CL are formed on an upper surface of a protective film PAS.

Figure 8A:
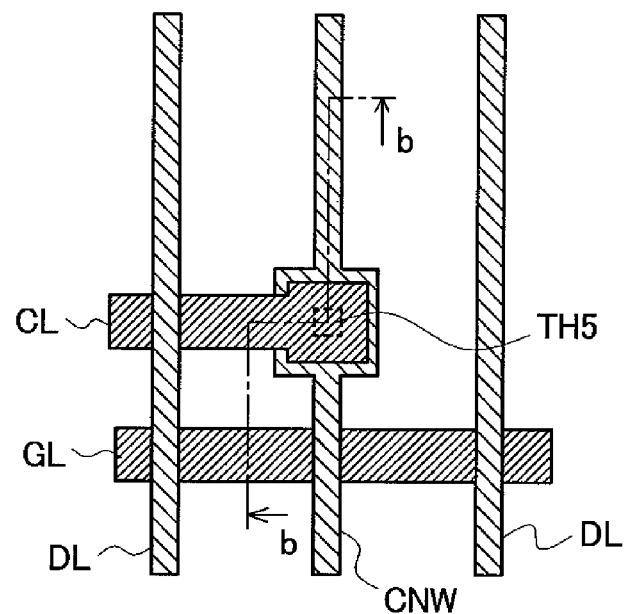
FIG. 8A is an enlarged plan view of a portion inside a dotted rectangular frame in FIG. 7
Figure 8B:
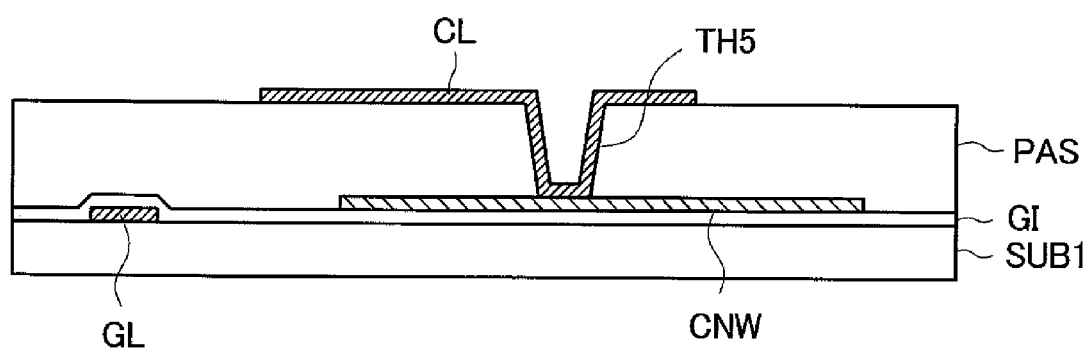
FIG. 8B is a cross-sectional view taken along a line b-b in FIG. 8A.

FIG. 8A is an enlarged view of a portion described in a dotted rectangular frame a in FIG. 7, and FIG. 8B is a cross-sectional view taken along a line b-b in FIG. 8A.

As shown in FIG. 8B, a connection line CNW is, for example, formed on an upper surface of an insulation film GI, that is, on the same layer as a drain signal line DL. The electrical connection between the common signal line CL and the connection line CNW is directly established via a through hole TH5 formed in the protective film PAS.

When the above-mentioned constitution is adopted by a lateral-electric-field type liquid crystal display device, the display device may be configured, as an example, such that a counter electrode CT which constitutes a planar electrode is formed on a surface of a protective film PAS in an directly overlapping manner with a common signal line CL, and a plurality of linear pixel electrodes which are arranged parallel to each other is formed on the counter electrode CT by way of an interlayer insulation film is taken.

Embodiment 6

Figure 9A:
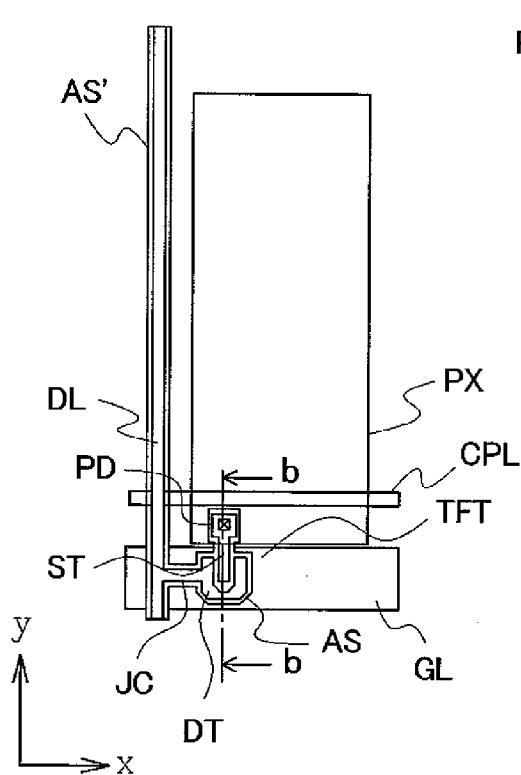
FIG. 9A and FIG. 9B are constitutional views showing a pixel of the display device according to an embodiment 6 of the present invention.
Figure 9B:
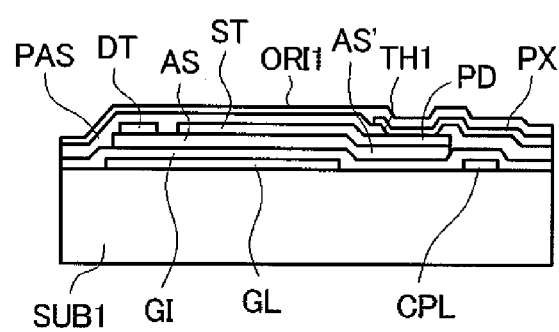

FIG. 9A and FIG. 9B are views showing an embodiment 6 of the display device according to the present invention, and correspond to FIG. 2A and FIG. 2B.

The constitution of the embodiment 6 shown in FIG. 9A and FIG. 9B differs from the constitution of the embodiment 1 shown in FIG. 2A and FIG. 2B as follows. That is, on a substrate SUB1 side, a pixel electrode PX is constituted of a planar transparent electrode which is formed in a most region of a pixel region at the center excluding a slight periphery, and a counter electrode which generates an electric field together with the pixel electrode PX is not formed. That is, FIG. 9A and FIG. 9B show the constitution of the pixel in a so-called vertical-electric-field-type liquid crystal display device. In the vertical-electric-field-type liquid crystal display device, the counter electrode is formed on a substrate SUB2 side which is arranged to face the substrate SUB1 on which a thin film transistor TFT is formed in an opposed manner with liquid crystal sandwiched therebetween and hence, although the pixel electrode PX is formed on the substrate SUB1 side, the counter electrode is not formed on the substrate SUB1 side.

Accordingly, the above-mentioned common signal lines CL are not formed on the substrate SUB1 side. However, there may be a case that a capacitive signal lines CPL having the same pattern as the common signal line CL are formed. The capacitive signal line CPL is, for example, in the same manner as the common signal line CL shown in FIG. 1A, arranged parallel to the gate signal line GL between a pair of neighboring gate signal lines GL.

In each pixel, the capacitive signal line CPL overlaps with the pixel electrode PX by way of an insulation film (insulation film GI, protective film PAS) thus forming a capacitive element which forms the insulation film between the pixel electrode PX and the capacitive signal line CPL as a dielectric film. The capacitive element has a function of storing a video signal supplied to the pixel electrode PX for a long period.

The capacitive signal line CPL may be configured such that in each pixel, the capacitive signal line CPL overlaps with a source electrode ST by way of an insulation film GI thus forming a capacitive element which uses the insulation film as a dielectric film between a source electrode ST and the capacitive signal line CPL. This capacitive element also has a function of storing a video signal supplied to the pixel electrode PX for a long period.

Such a capacitive signal line CNL has, in the same manner as the above-mentioned common signal line CL, a drawback shown in FIG. 10. Accordingly, by applying the present invention to the capacitive signal line CPL, it is possible to obtain the advantageous effect that an area which the arrangement of signal lines occupies in a periphery of the opening portion (non-display region) can be decreased.

Embodiment 7

In the above-mentioned embodiment, the common signal line CL or the capacitive signal line CPL is arranged parallel to the gate signal lines GL between the neighboring gate signal lines GL. However, the present invention is not limited to such a constitution, and the present invention is also applicable to a case in which the common signal line CL or the capacitive signal line CPL is arranged parallel to the drain signal lines DL between the neighboring drain signal lines DL.

Embodiment 8

In the above-mentioned embodiments, the explanation has been made with respect to examples which adopts the liquid crystal display device as the display device. However, the present invention is also applicable to other display device such as an organic electroluminescence display device or the like, for example.

What is claimed is:

1. A display device which forms a plurality of gate signal lines arranged parallel to each other in one direction, a plurality of drain signal lines arranged parallel to each other in another direction which intersects said one direction, and a plurality of common signal lines arranged along one group of signal lines out of the gate signal lines and the drain signal lines, each common signal line being arranged between respective signal lines of said one group of signal lines on a substrate, and which defines a region surrounded by a pair of neighboring gate signal lines and a pair of neighboring drain signal lines as a region of a pixel, wherein a non-display region is formed in a portion of a display region which is formed of a mass of the pixels, out of the plurality of gate signal lines and the plurality of drain signal lines, the gate signal lines and the drain signal lines which are arranged so as to traverse the non-display region when the gate signal lines and the drain signal lines straightly extend imaginarily are formed in a pattern where the gate signal lines and the drain signal lines are routed around the non-display region, out of the plurality of common signal lines, first common signal lines which are arranged so as to traverse the non-display region when the first common signal lines straightly extend imaginarily are formed in a state that the first common signal lines are physically separated to be arranged on one side and another side of the non-display region, the separated common signal lines on respective sides are respectively electrically connected to a connection lines arranged in an intersecting manner with the common signal lines in the vicinity of the non-display region, and the connection lines are electrically connected with second common signal lines which are arranged so as not to traverse the non-display region even when the second common signal lines straightly extend imaginarily out of the plurality of common signal lines, and the first common signal lines which are physically separated by the non-display region extend closer to a non-display region side than connection portions between the first common signal lines and the connection line, and extending portions of the first common signal lines have intersecting portions where the first common signal lines intersect with the signal lines extending in the direction which intersects with the common signal lines out of the drain signal lines and the gate signal lines.

2. A display device according to claim 1, wherein at least one common signal line out of the first common signal lines which are physically separated by the non-display region is provided with, on an edge portion of the non-display region side, one or a plurality of branch lines which intersects with the signal lines extending in the direction which intersect with the common signal lines out of the drain signal lines and the gate signal lines.

3. A display device according to claim 1, wherein at least one common signal line out of the first common signal lines which are physically separated by the non-display region is provided with, on an edge portion of the non-display region side, a plurality of intersecting portions where the common signal line intersects with the signal lines extending in the direction which intersects with the common signal line out of the drain signal lines and the gate signal lines, and is a large width line which increases a line width thereof corresponding to the number of the plurality of intersecting portions on the non-display-region-side.

4. A display device which forms a plurality of gate signal lines arranged parallel to each other in one direction, a plurality of drain signal lines arranged parallel to each other in another direction which intersects said one direction, and a plurality of common signal lines arranged along one group of signal lines out of the gate signal lines and the drain signal lines, each common signal line being arranged between respective signal lines of said one group of signal lines on a substrate, and which defines a region surrounded by a pair of neighboring gate signal lines and a pair of neighboring drain signal lines as a region of a pixel, wherein a non-display region is formed in a portion of a display region which is formed of a mass of the pixels, out of the plurality of gate signal lines and the plurality of drain signal lines, the gate signal lines and the drain signal lines which are arranged so as to traverse the non-display region when the gate signal lines and the drain signal lines straightly extend imaginarily are formed in a pattern where the gate signal lines and the drain signal lines are routed around the non-display region, out of the plurality of common signal lines, first common signal lines which are arranged so as to traverse the non-display region when the first common signal lines straightly extend imaginarily are formed in a state that the first common signal lines are physically separated to be arranged on one side and another side of the non-display region, the separated common signal lines on respective sides are respectively electrically connected to a connection lines arranged in an intersecting manner with the common signal lines in the vicinity of the non-display region, and the connection lines are electrically connected with second common signal lines which are arranged so as not to traverse the non-display region even when the second common signal lines straightly extend imaginarily out of the plurality of common signal lines, the pixel includes a pixel electrode to which a video signal is supplied from the drain signal line via a thin film transistor, and a counter electrode to which a reference signal which becomes the reference with respect to the video signal is supplied on the substrate, and the common signal line is a signal line which is formed along the gate signal line and supplies the reference signal to the counter electrode, and out of the pixel electrode and the counter electrode, one electrode is a planar first electrode, and another electrode out of the pixel electrode and the counter electrode includes a plurality of linear second electrodes which are arranged parallel to each other above the first electrode by way of an insulation film, and the electrical connection between the connection line and the common signal line is established via a layer which is formed on the same layer as the first electrode and is made of the same material as the first electrode.

* * * * *